United States Patent
Mori et al.

(10) Patent No.: US 10,425,027 B2
(45) Date of Patent: Sep. 24, 2019

(54) VARIABLE-SPEED OPERATION CONTROL APPARATUS AND HYDROELECTRIC POWER GENERATION SYSTEM

(71) Applicant: Kabushiki Kaisha Toshiba, Minato-ku (JP)

(72) Inventors: Junji Mori, Kokubunji (JP); Masahiko Nakazono, Kawasaki (JP); Oki Osada, Yokohama (JP); Yuichi Shiozaki, Tachikawa (JP); Takeyoshi Asano, Kunitachi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 60 days.

(21) Appl. No.: 15/046,631

(22) Filed: Feb. 18, 2016

(65) Prior Publication Data

US 2016/0248357 A1    Aug. 25, 2016

(30) Foreign Application Priority Data

Feb. 23, 2015 (JP) ................... 2015-033302

(51) Int. Cl.
*H02P 9/48* (2006.01)
*H02P 27/00* (2006.01)
(Continued)

(52) U.S. Cl.
CPC ............... *H02P 9/48* (2013.01); *F03B 13/08* (2013.01); *F03B 15/00* (2013.01); *H02J 3/38* (2013.01);
(Continued)

(58) Field of Classification Search
CPC ....... Y02E 10/28; Y02E 10/725; F03B 13/00; F03B 13/08; H02P 9/48; H02P 1/52;
(Continued)

(56) References Cited

U.S. PATENT DOCUMENTS 3,885,200 A * 5/1975 Burkle ................ G08B 21/182
                                                   361/103
4,496,845 A * 1/1985 Ensign .................... F03B 15/12
                                                    290/43
(Continued)

FOREIGN PATENT DOCUMENTS

EP    2 818 692 A1    12/2014
JP    11-280634       10/1999
(Continued)

OTHER PUBLICATIONS

Jon Are Suul, Wind Power Integration in Isolated Grids enabled by Variable Speed Pumped Storage Hydropower Plant, 2008, IEEE, ICSET 2008, pp. 399-404.*

(Continued)

*Primary Examiner* — Charles Reid, Jr.
(74) *Attorney, Agent, or Firm* — Oblon, McClelland, Maier & Neustadt, L.L.P.

(57) ABSTRACT

According to one embodiment, there is provided a variable-speed operation control apparatus of a hydroelectric power generation system including a power generator interconnected to a power system through a main circuit and a water turbine directly connected to the power generator. The apparatus includes a branch circuit branched from the main circuit and including a frequency converter which performs conversion between an output frequency of the power generator and a system frequency of the power system, wherein the power generator is interconnected to the power system through the branch circuit when a flow rate of water is less than a fixed level.

10 Claims, 3 Drawing Sheets

(51) Int. Cl.
*H02J 3/38* (2006.01)
*H02P 1/52* (2006.01)
*H02P 9/42* (2006.01)
*F03B 13/08* (2006.01)
*H02K 7/18* (2006.01)
*F03B 15/00* (2006.01)

(52) U.S. Cl.
CPC ............ *H02K 7/1823* (2013.01); *H02P 1/52* (2013.01); *H02P 9/42* (2013.01); *H02P 27/00* (2013.01); *F05B 2270/327* (2013.01)

(58) Field of Classification Search
CPC ... H02P 9/42; H02P 27/00; H02J 3/38; H02K 7/1823
USPC .......................................... 290/43, 54, 42, 53
See application file for complete search history.

(56) References Cited

U.S. PATENT DOCUMENTS

| | | | | |
|---|---|---|---|---|
| 4,641,040 | A * | 2/1987 | Megnint | F03B 15/06 290/52 |
| 5,509,434 | A * | 4/1996 | Boyd | G05D 7/0635 137/486 |
| 6,680,856 | B2 * | 1/2004 | Schreiber | H02M 5/458 307/82 |
| 6,847,128 | B2 * | 1/2005 | Mikhail | F03D 7/0224 290/44 |
| 7,972,502 | B2 * | 7/2011 | Tsutsumi | C02F 3/04 210/150 |
| 8,026,699 | B2 * | 9/2011 | Schreiber | H02P 9/007 322/44 |
| 8,305,778 | B2 * | 11/2012 | Jiang-Hafner | H02M 5/4505 290/44 |
| 8,451,636 | B2 * | 5/2013 | Gruber | H02M 1/36 363/35 |
| 8,930,034 | B1 * | 1/2015 | Wilson | H02J 3/38 700/286 |
| 9,002,617 | B2 * | 4/2015 | Tanriverdi | F02C 9/00 701/100 |
| 2005/0200337 | A1 | 9/2005 | Schreiber et al. | |
| 2006/0120502 | A1 * | 6/2006 | Tomiki | F04D 7/08 376/402 |
| 2008/0223684 | A1 * | 9/2008 | Duffey | F16D 43/22 192/105 R |
| 2008/0239027 | A1 * | 10/2008 | Kinase | B41J 2/175 347/85 |
| 2010/0148579 | A1 * | 6/2010 | Maloney | H02J 1/14 307/20 |
| 2011/0075465 | A1 * | 3/2011 | Winkelnkemper | H02M 5/271 363/148 |
| 2015/0220044 | A1 * | 8/2015 | Tatsumoto | H02J 3/38 307/43 |
| 2016/0181909 | A1 | 6/2016 | Steimer et al. | |

FOREIGN PATENT DOCUMENTS

| | | | |
|---|---|---|---|
| JP | 2003-88190 A | 3/2003 | |
| JP | 2006-141112 A | 6/2006 | |
| JP | 2007-195315 A | 8/2007 | |
| JP | 2015-12636 A | 1/2015 | |
| WO | WO 2005/073550 A1 | 8/2005 | |
| WO | WO 2014169302 A1 * | 10/2014 | ............ F03D 15/00 |
| WO | WO 2015/028663 A1 | 3/2015 | |
| WO | WO 2015028663 A1 * | 3/2015 | ............ F03B 13/16 |

OTHER PUBLICATIONS

Extended European Search Report dated Jul. 27, 2016 in Patent Application No. 16156134.5.
Jon Are Suul, et al., "Wind Power Integration in Isolated Grids enabled by Variable Speed Pumped Storage Hydropower Plant" Sustainable Energy Technologies, XP031442202, 2008, pp. 399-404.
Jon Are Suul, et al., "Variable speed pumped storage hydropower for integration of wind energy in isolated grids—case description and control strategies" Nordic Workshop on Power and Industrial Electronics, XP002759904, 2008, 8 Pages.
H. Schlunegger, et al., "100 MW full-size, converter in the Grimsel 2 pumped-storage plant" Obernasli Hydroelectric Power Company, retrieved from the Internet; URL:http://www.grimselstron.ch/home/download/1291, XP002759905, 2013, 6 Pages.

* cited by examiner

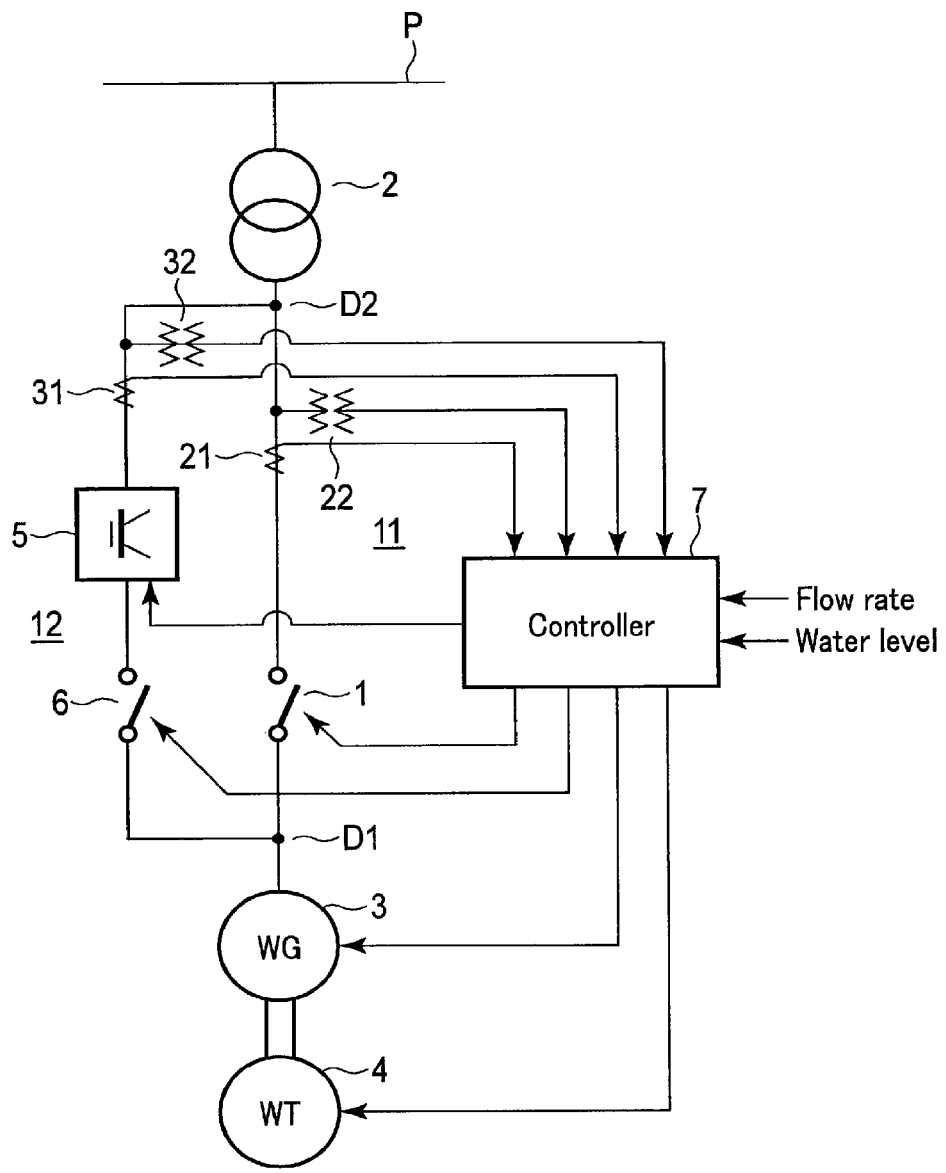
F I G. 1

VARIABLE-SPEED OPERATION CONTROL APPARATUS AND HYDROELECTRIC POWER GENERATION SYSTEM

CROSS-REFERENCE TO RELATED APPLICATIONS

This application is based upon and claims the benefit of priority from Japanese Patent Application No. 2015-033302, filed Feb. 23, 2015, the entire contents of which are incorporated herein by reference.

FIELD

Embodiments described herein relate generally to a variable-speed operation control apparatus and a hydroelectric power generation system.

BACKGROUND

Small-and-medium-sized hydroelectric power plants are generally run-off-river-type plants. In such a plant, an output varies depending on a flow rate of a river. If the flow rate of the river drops considerably, a strong swirling flow may be produced and cavitation may occur at a runner outlet of a water turbine. As a result, large vibrations and loud noise may occur in a tube of the plant, and stable operation will be difficult. Therefore, in general, a minimum flow rate which allows the power plant to operate is determined in advance, and when the flow rate drops below the minimum, operation of the power plant facility is stopped. As a technique to suppress vibrations which may occur during operation under partial load of a water turbine, an improved arrangement of fins attached to a draft tube of a water turbine is known.

When the flow rate of the river is less than the minimum determined in advance, the river water at that time is discharged without being used for power generation. Thus, energy is wastefully released. However, even when the flow rate of the river is low, if the rotation speed of the runner is reduced, the swirling can be weakened and the vibrations and noise can be suppressed. Accordingly, stable operation can be conducted.

However, if the power generator is directly connected to the power system, the rotation speed will be kept constant during operation. Thus, the rotation speed cannot be changed.

Under these circumstances, it is desired to provide a variable-speed operation control apparatus and a hydroelectric power generation system, in which even when the flow rate of a river or the like is less than a fixed level, a stable operation can be conducted by reducing the rotation speed.

BRIEF DESCRIPTION OF THE DRAWINGS

FIG. 1 is a schematic diagram showing a hydroelectric power generation system according to an embodiment;

DETAILED DESCRIPTION

Figure 2:
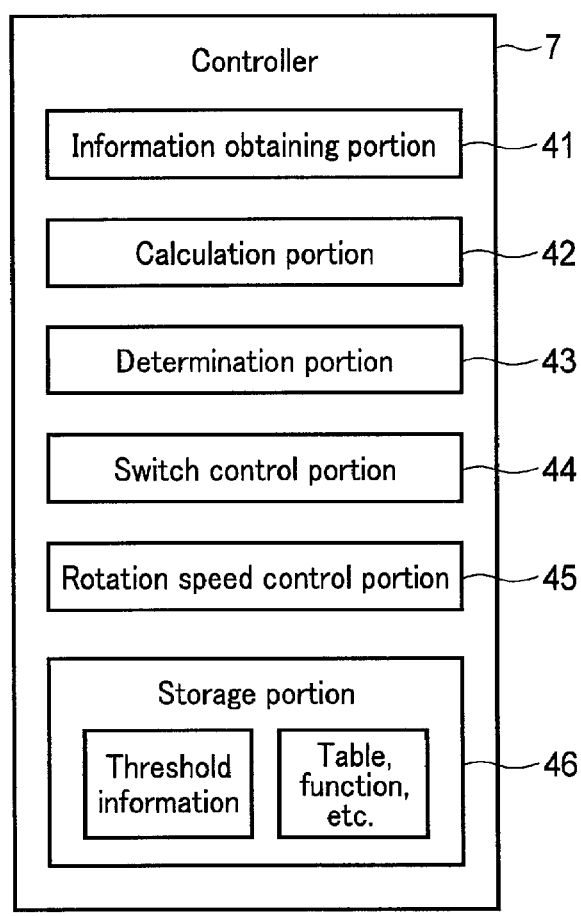
FIG. 2 is a block diagram showing a functional configuration of a control apparatus in the embodiment.

In general, according to one embodiment, there is provided a variable-speed operation control apparatus of a hydroelectric power generation system including a power generator interconnected to a power system through a main circuit and a water turbine directly connected to the power generator. The variable-speed operation control apparatus includes a branch circuit branched from the main circuit and including a frequency converter which performs conversion between an output frequency of the power generator and a system frequency of the power system, wherein the power generator is interconnected to the power system through the branch circuit when a flow rate of water is less than a fixed level.

Embodiments will be described with reference to the drawings.

FIG. 1 is a schematic diagram showing a hydroelectric power generation system according to an embodiment.

The hydroelectric power generation system shown in FIG. 1 includes a power generator 3 interconnected to a power system P through a main circuit 11 including a breaker 1 and a main transformer 2; and a water turbine 4 directly connected to the power generator 3.

The hydroelectric power generation system further includes a branch circuit 12, which branches from the main circuit 11 at branch points D1 and D2. The branch circuit 12 is a circuit bypassing the breaker 1, and includes a frequency converter 5 which performs conversion between an output frequency of the power generator 3 and a system frequency of the power system P, and a breaker 6 connected in series with the frequency converter 5.

The branch circuit 12 is a special circuit that is used only for operations other than a normal operation, for example, only in the case where the flow rate is less than the minimum flow rate required for normal operation. The frequency converter 5 in the branch circuit 12 has a limited capacity necessary to realize operation in a less-than-minimum flow rate. It has a smaller capacity and size in comparison to the power generator 3. The frequency converter 5 is capable of changing a frequency of the power generator 3, such that it can change the rotation speed (or the number of rotations or frequency) of the power generator 3 and the water turbine 4.

The hydroelectric power generation system further includes a controller 7 which controls operations of the system. The controller 7 can change the rotation speed (or the number of rotations or frequency) of the power generator 3 and the water turbine 4 by opening or closing the breakers 1 and 6 in accordance with situations, or by changing the frequency output from the side of the power generator 3 of the frequency converter 5 when the breaker 6 is closed. For example, when the flow rate of water (for example, the flow rate of a river or of water flowing to the water turbine 4) does not reach a fixed level, the controller 7 executes a control of changing an interconnection route by operating the breaker 1 and the breaker 6 (switching the breaker 1 from a closed position to an open position and switching the breaker 6 from an open position to a closed position) to interconnect the power generator 3 to the power system P through the branch circuit 12, and a control of operating the frequency converter 5 (gradually lowering the frequency output from the frequency converter 5 on the side of the power generator 3 from the normal frequency (e.g., 50 Hz)) to gradually lower the rotation speed of the power generator 3 and the water turbine 4 to a target rotation speed.

When the flow rate returns to a normal state, the controller 7 performs a control of operating the frequency converter 5 (gradually increasing the frequency output from the frequency converter 5 on the side of the power generator 3 toward the normal frequency (e.g., 50 Hz)) to increase the rotation speed of the power generator 4 and the water turbine 3 to the normal rotation speed, and a control of changing the interconnection route by operating the breaker 1 and the breaker 6 (switching the breaker 6 from the closed position to the open position and switching the breaker 1 from the open position to the closed position) to interconnect the power generator 3 to the power system P through the main circuit 11, not through the branch circuit 12.

The example shown in FIG. 1 uses the breaker 6 as switching equipment in the branch circuit 12. However, the breaker 6 may be replaced with another type of switch, for example, a semiconductor switch, which fulfills a function similar to that of the breaker 6. Use of a semiconductor switch can realize high-speed performance that cannot be realized by a mechanical switch.

A current transformer (CT) 21 and a potential transformer (PT) 22, which respectively detect a current and a voltage when the main circuit 11 is used, are provided between the breaker 1 and the branch point D2 of the main circuit 11. Results of the detection are sent to the controller 7. Similarly, a current transformer (CT) 31 and a potential transformer (PT) 32, which respectively detect a current and a voltage when the branch circuit 12 is used, are provided between the frequency converter 5 and the branch point D2 of the branch circuit 12. Results of the detection are sent to the controller 7.

The controller 7 can: obtain a current value and a voltage value detected by the current transformer 21 and the potential transformer 22 in the main circuit 11 and calculate an output of the power generator 3 based on these values; obtain information on a current and a voltage detected by the current transformer 31 and the potential transformer 32 in the branch circuit 12 and calculate a frequency-converted output of the power generator 3 based on these values; obtain information on the flow rate of water (for example, the flow rate of a river or of water flowing to the water turbine 4); and obtain information on a water level (for example, a water level of a dam, etc. of a reservoir, and calculate a drop (for example, a difference in height between a water intake level and a water outflow level) from the water level. The obtained information and calculated information are used to determine whether to switch the route interconnecting the power generator 3 to the power system P.

The variable-speed operation control apparatus of this embodiment may be composed of at least the branch circuit 12 and the controller 7 described above.

FIG. 2 is a block diagram showing a functional configuration of the controller 7.

The controller 7 includes a variety functions: an information obtaining portion 41, a calculation portion 42, a determination portion 43, a switch control portion 44, a rotation speed control portion 45 and a storage portion 46.

The information obtaining portion 41 has a function of obtaining a current value and a voltage value detected by the current transformer 21 and the potential transformer 22 of the main circuit 11, a current and a voltage detected by the current transformer 31 and the potential transformer 32 of the branch circuit 12, and information on a flow rate and a water level.

The calculation portion 42 has a function of: obtaining an output of the power generator 3 from the detected current value and voltage value using a table (correspondence table), a function or an arithmetic expression; calculating a drop from the detected water level; and obtaining a rotation speed (or the number of rotations or frequency) of the water turbine 4 and the power generator 3, which will be less liable to cause cavitation, based on the detected flow rate.

The determination portion 43 has a function of comparing a flow rate, a drop, or an output with a corresponding threshold, and determining whether to switch the interconnection route.

The switch control portion 44 has a function of controlling switching of the interconnection route in accordance with a result of determination in the determination portion 43.

The rotation speed control portion 45 has a function of controlling rotation of the water turbine 4 and the power generator 3 at an appropriate rotation speed corresponding to the flow rate by operation of the frequency converter 5.

The storage portion 46 has a memory function of storing a table (correspondence table), a function, or an arithmetic expression which the calculation portion 42 uses. It stores, for example, a table showing the relationship between a flow rate and an appropriate rotation speed (or the number of rotations or frequency) corresponding to the flow rate. Accordingly, an appropriate rotation speed (or the number of rotations or frequency) corresponding to the flow rate can be derived from, for example, a flow rate less than the minimum. The storage portion 46 also stores a table showing the relationship between a drop and an appropriate rotation speed (or the number of rotations or frequency) corresponding to the drop, and a table showing the relationship between an output and an appropriate rotation speed (or the number of rotations or frequency) corresponding to the output.

The controller 7 selectively performs, for example, the following controls using a variety of functions described above.

(Control in Accordance with "A Flow Rate")

For example, when the controller 7 obtains information indicative of a flow rate and determines that the flow rate is less than a predetermined value, it can perform control of switching the interconnection route to interconnect the power generator 3 with the power system P through the branch circuit 12.

(Control in Accordance with "A Drop")

The controller 7 obtains information indicative of a water level and calculates a drop from the water level. When the drop is smaller than a predetermined value, the controller 7 can perform control of switching the interconnection route to interconnect the power generator 3 with the power system P through the branch circuit 12.

(Control in Accordance with "An Output")

The controller 7 obtains an output of the power generator 3 by the calculation portion 42 from the obtained voltage and current of the main circuit 11. When the output is smaller than a predetermined value, the controller 7 can perform control of switching the interconnection route to interconnect the power generator 3 with the power system P through the branch circuit 12.

The controller 7 obtains an output of the power generator 3 in the case of using the branch circuit 12 and an output of the power generator 3 in the case using the main circuit 11 without using the branch circuit 12. When a greater one of these outputs is smaller than a predetermined value, the controller 7 can perform control of switching the interconnection route to interconnect the power generator 3 with the power system P through the branch circuit 12.

The frequency converter 5 shown in FIG. 1 has a smaller capacity and size in comparison to the power generator 3. The capacity of the frequency converter 5 can be further reduced, while ensuring a capacity necessary to realize operation at the less-than-minimum flow rate. In that case, the reduction of the capacity can be achieved by connecting, for example, a relatively compact transformer in series to both or either side of the frequency converter 5.

Figure 3:
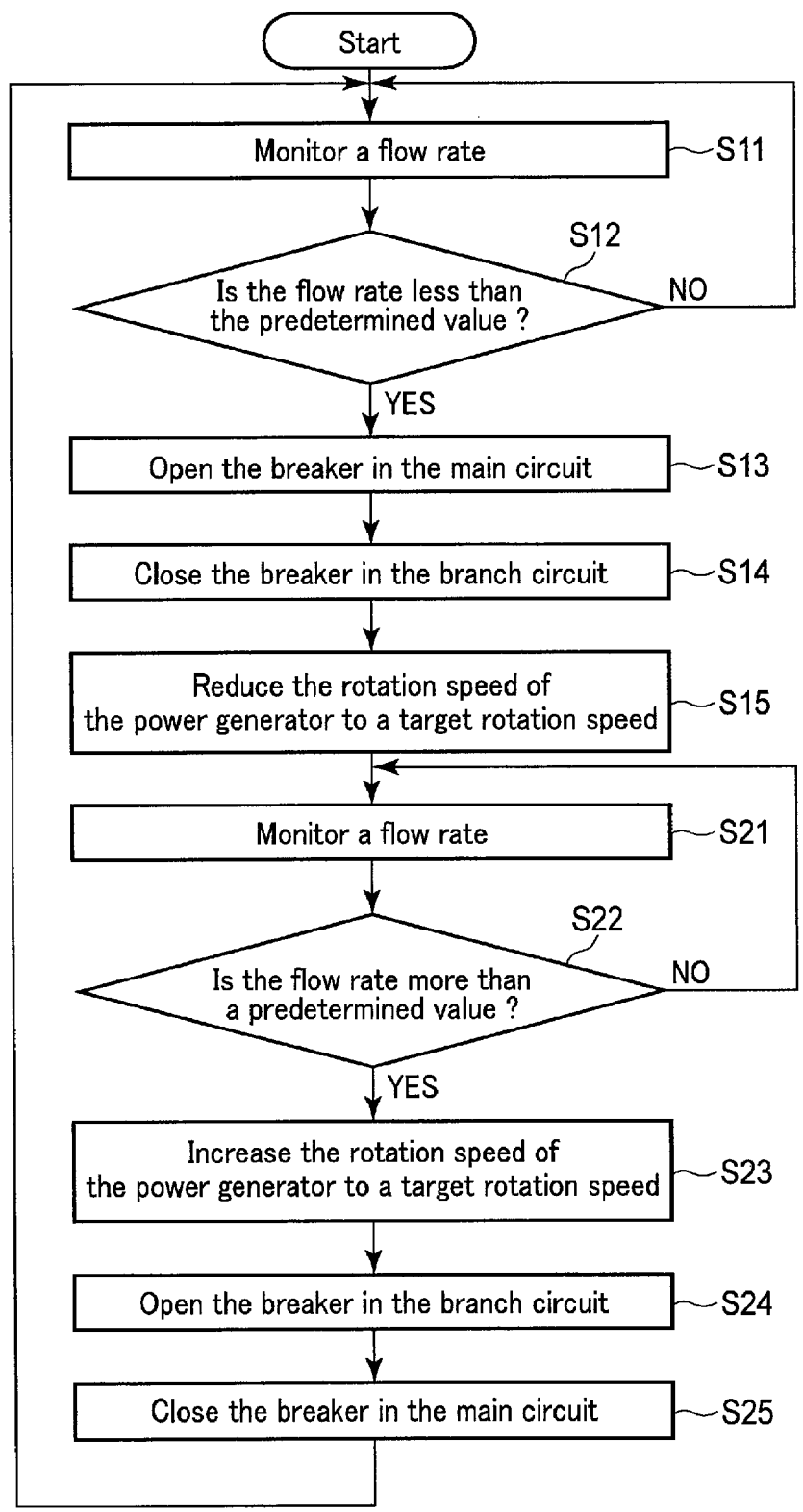
FIG. 3 is a flowchart showing an example of operation by the control apparatus in the embodiment.

An operation of the controller 7 will be described with reference to the flowchart shown in FIG. 3.

In the following, an example of control in accordance with "a flow rate" will be explained.

It is assumed that the hydroelectric power generation system is performing a normal operation, the breaker 1 in the main circuit 11 is in the closed position, and the breaker 6 in the branch circuit 12 is in the open position.

As the controller 7 is monitoring a state of the flow rate, it obtains information on the flow rate of water (for example, the flow rate of a river or of water flowing to the water turbine 4) (step S11). The controller 7 periodically determines whether the flow rate is less than a predetermined value (step S12). If the flow rate is not less than the predetermined value (NO in step S12), the operation returns to step S11 and the processing is repeated.

If the flow rate is less than the predetermined value (YES in step S12), the controller 7 operates the breakers 1 and 6, such that the power generator 3 is interconnected to the power system P through the branch circuit 12. Specifically, the breaker 1 is switched from the closed position to the open position (step S13), and thereafter the breaker 6 is switched from the open position to the closed position (step S14). Then, the controller 7 operates the frequency converter 5 to reduce the rotation speed of the power generator 3 and the water turbine 4 to a target rotation speed (step S15). In this case, the controller 7 gradually lowers the frequency output from the frequency converter 5 on the side of the power generator 3 from the normal frequency (e.g., 50 Hz) to gradually lower the rotation speed of the power generator 3 and the water turbine 4 to a target rotation speed.

As a result, even when the flow rate of a river or the like is less than a fixed value, a stable operation which is less liable to cause cavitation can be conducted by reducing the rotation speed.

The controller 7 subsequently monitors a state of the flow rate, while obtaining information on the flow rate of water (step S21), and periodically determines whether the flow rate is more than a predetermined value (step S22). If the flow rate is not more than the predetermined value (NO in step S22), the operation returns to step S21 and the processing is repeated.

If the flow rate is more than the predetermined value (YES in step S22), the controller 7 operates the frequency converter 5 to gradually increase the rotation speed of the power generator 3 and the water turbine 4 to a normal rotation speed (step S23). In this case, the controller 7 gradually increases the frequency output from the frequency converter 5 on the side of the power generator 3 toward the normal frequency (e.g., 50 Hz) to gradually increase the rotation speed of the power generator 4 and the water turbine 3 to the normal rotation speed (step S23). When the rotation speed has increased to the normal rotation speed, the controller 7 operates the breakers 1 and 6, such that the power generator 3 is interconnected to the power system P through the main circuit 11, not through the branch circuit 12. Specifically, the breaker 6 is switched from the closed position to the open position (step S24), and thereafter the breaker 1 is switched from the open position to the closed position (step S25).

Accordingly, the apparatus returns to the normal operation state. Thereafter, the operation returns to step S11 and the processing is repeated.

According to the embodiment described above, undesired loss by the frequency converter does not occur during the normal operation. Furthermore, even during operation in a less-than-minimum flow rate, a large loss can be avoided, since a minimum capacity converter is used. Furthermore, stable operation which will be less liable to cause cavitation can be performed.

As described above, according to the embodiment, even when the flow rate of a river or the like is less than a fixed level, a stable operation can be conducted by reducing the rotation speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A variable-speed operation control apparatus of a hydroelectric power generation system including a power generator interconnected to a power system including a main transformer through a main circuit and a water turbine directly connected to the power generator, the variable-speed operation control apparatus comprising:
    a branch circuit branched from the main circuit and including a frequency converter which performs conversion between an output frequency of the power generator and a system frequency of the power system, the branch circuit comprising first and second switches connected in parallel, the first switch connected between the power generator and the frequency converter and the second switch directly connected between the power generator and the main transformer to pass an output from the power generator to the main transformer; and
    a controller configured to perform control of, when the flow rate of water is less than a minimum flow rate required for a predetermined operation, switching an interconnection route to interconnect the power generator with the power system through the branch circuit, and reducing a rotation speed of the power generator and the water turbine by operating the frequency converter,
    wherein the frequency converter has a smaller capacity in size in comparison to the power generator.

2. The variable-speed operation control apparatus of the hydroelectric power generation system according to claim 1, wherein:
    the main circuit includes a first breaker;
    the branch circuit includes a second breaker connected in series to the frequency converter; and
    the controller is further configured to perform control of, when the flow rate of water is less than the minimum flow rate, switching the first breaker from a closed position to an open position and switching the second breaker from an open position to a closed position.

3. The variable-speed operation control apparatus of the hydroelectric power generation system according to claim 1, wherein:
    the main circuit includes a breaker;
    the branch circuit includes a semiconductor switch connected in series to the frequency converter; and
    the controller is further configured to perform control of, when the flow rate of water is less than the minimum flow rate, switching the breaker from a closed position to an open position and switching the semiconductor switch from an open position to a closed position.

4. The variable-speed operation control apparatus of the hydroelectric power generation system according to claim 1, wherein the controller is further configured to obtain information indicative of a flow rate of water, and obtain the rotation speed of the water turbine and the power generator where an occurrence of cavitation is less liable, based on the flow rate of water, and when the flow rate is less than the minimum flow rate, the controller is further configured to perform control of reducing the rotation speed of the power generator and the water turbine.

5. The hydroelectric power generation system including the variable-speed operation control apparatus according to claim 1.

6. A variable-speed operation control apparatus of a hydroelectric power generation system including a power generator interconnected to a power system including a main transformer through a main circuit and a water turbine directly connected to the power generator, the variable-speed operation control apparatus comprising:
a branch circuit branched from the main circuit and including a frequency converter which performs conversion between an output frequency of the power generator and a system frequency of the power system, the branch circuit comprising first and second switches connected in parallel, the first switch connected between the power generator and the frequency converter and the second switch directly connected between the power generator and the main transformer to pass an output from the power generator to the main transformer; and
a controller configured to perform control of obtaining information indicative of a water level of a reservoir and calculating a drop from the water level, and when the drop is less than a minimum drop required for a predetermined operation, switching an interconnection route to interconnect the power generator with the power system through the branch circuit, and reducing a rotation speed of the power generator and the water turbine by operating the frequency converter,
wherein the frequency converter has a smaller capacity in size in comparison to the power generator.

7. The hydroelectric power generation system including the variable-speed operation control apparatus according to claim 6.

8. A variable-speed operation control apparatus of a hydroelectric power generation system including a power generator interconnected to a power system including a main transformer through a main circuit and a water turbine directly connected to the power generator, the variable-speed operation control apparatus comprising:
a branch circuit branched from the main circuit and including a frequency converter which performs conversion between an output frequency of the power generator and a system frequency of the power system, the branch circuit comprising first and second switches connected in parallel, the first switch connected between the power generator and the frequency converter and the second switch directly connected between the power generator and the main transformer to pass an output from the power generator to the main transformer; and
a controller configured to perform control of obtaining a power output of the power generator by a calculation, and when the power output is less than a minimum power output required for a predetermined operation, switching an interconnection route to interconnect the power generator with the power system through the branch circuit, and reducing a rotation speed of the power generator and the water turbine by operating the frequency converter,
wherein the frequency converter has a smaller capacity in size in comparison to the power generator.

9. The hydroelectric power generation system including the variable-speed operation control apparatus according to claim 8.

10. A variable-speed operation control apparatus of a hydroelectric power generation system including a power generator interconnected to a power system including a main transformer through a main circuit and a water turbine directly connected to the power generator, the variable-speed operation control apparatus comprising:
a branch circuit branched from the main circuit and including a frequency converter which performs conversion between an output frequency of the power generator and a system frequency of the power system, the branch circuit comprising first and second switches connected in parallel, the first switch connected between the power generator and the frequency converter and the second switch directly connected between the power generator and the main transformer to pass an output from the power generator to the main transformer; and
a controller configured to perform control of obtaining a power output of the power generator when using the branch circuit and obtaining a power output of the power generator when using the main circuit without using the branch circuit, and when a greater one of these outputs is smaller than a predetermined value, switching an interconnection route to interconnect the power generator with the power system through the branch circuit, and reducing a rotation speed of the power generator and the water turbine by operating the frequency converter,
wherein the frequency converter has a smaller capacity in size in comparison to the power generator.

* * * * *